(12) United States Patent
Hong et al.

(10) Patent No.: US 8,287,372 B2
(45) Date of Patent: Oct. 16, 2012

(54) INTERACTIVE TOY AND DISPLAY SYSTEM

(75) Inventors: Brian Hong, Valencia, CA (US); Eric Skifstrom, Manhattan Beach, CA (US); Jeffrey H. Levine, Los Angeles, CA (US)

(73) Assignee: Mattel, Inc., El Segundo, CA (US)

( * ) Notice: Subject to any disclaimer, the term of this patent is extended or adjusted under 35 U.S.C. 154(b) by 1396 days.

(21) Appl. No.: 11/862,080

(22) Filed: Sep. 26, 2007

(65) Prior Publication Data

US 2008/0081694 A1  Apr. 3, 2008

Related U.S. Application Data

(60) Provisional application No. 60/848,146, filed on Sep. 28, 2006.

(51) Int. Cl.
*A63F 13/02* (2006.01)

(52) U.S. Cl. .................. 463/34; 463/32; 463/36

(58) Field of Classification Search ............ 463/34
See application file for complete search history.

(56) References Cited

U.S. PATENT DOCUMENTS

| 5,059,958 | A | * | 10/1991 | Jacobs et al. ............. 345/158 |
| RE34,161 | E | | 1/1993 | Nakagawa et al. |
| 5,192,082 | A | | 3/1993 | Inoue et al. |
| 5,572,646 | A | | 11/1996 | Kawai et al. |
| 5,630,043 | A | | 5/1997 | Uhlin |
| 5,636,994 | A | | 6/1997 | Tong |
| 5,752,880 | A | | 5/1998 | Gabai et al. |
| 5,766,077 | A | * | 6/1998 | Hongo ............... 463/30 |
| 5,853,327 | A | * | 12/1998 | Gilboa ............... 463/39 |
| 5,913,727 | A | | 6/1999 | Ahdoot |
| 5,966,129 | A | | 10/1999 | Matsukuma et al. |
| 5,966,526 | A | | 10/1999 | Yokoi |
| 5,977,951 | A | | 11/1999 | Danieli et al. |
| 6,012,961 | A | | 1/2000 | Sharpe et al. |
| 6,022,273 | A | | 2/2000 | Gabai et al. |
| 6,028,593 | A | | 2/2000 | Rosenberg et al. |
| 6,075,195 | A | | 6/2000 | Gabai et al. |
| 6,102,397 | A | * | 8/2000 | Lee et al. .............. 273/238 |
| 6,108,012 | A | | 8/2000 | Naruki et al. |
| 6,160,540 | A | | 12/2000 | Fishkin et al. |
| 6,200,219 | B1 | | 3/2001 | Rudell et al. |
| 6,201,947 | B1 | | 3/2001 | Hur et al. |
| 6,213,871 | B1 | | 4/2001 | Yokoi |
| 6,227,966 | B1 | | 5/2001 | Yokoi |
| 6,238,291 | B1 | | 5/2001 | Fjimoto et al. |

(Continued)

FOREIGN PATENT DOCUMENTS

CN  1743037 A  3/2006

(Continued)

OTHER PUBLICATIONS

European Patent Office, Communication, Mar. 2, 2011, 6 pages.

(Continued)

*Primary Examiner* — Tramar Harper
(74) *Attorney, Agent, or Firm* — Kolisch Hartwell, PC

(57) ABSTRACT

An interactive toy system comprising a toy and a display configured to exhibit an electronic image associated with the toy. The system also includes a console configured to control the image exhibited by the display. Further, an adapter is configured to form a communication link between the toy and the console.

13 Claims, 4 Drawing Sheets

U.S. PATENT DOCUMENTS

| | | | |
|---|---|---|---|
| 6,251,012 B1 | 6/2001 | Horigami et al. | |
| 6,268,872 B1 | 7/2001 | Matsuda et al. | |
| 6,290,604 B2 | 9/2001 | Miyamoto et al. | |
| 6,312,335 B1 | 11/2001 | Tosaki et al. | |
| 6,366,288 B1 | 4/2002 | Naruki et al. | |
| 6,383,080 B1 * | 5/2002 | Link et al. | 463/47 |
| 6,461,238 B1 | 10/2002 | Rehkemper et al. | |
| 6,463,257 B1 | 10/2002 | Wood | |
| 6,517,438 B2 | 2/2003 | Tosaki et al. | |
| 6,537,149 B2 | 3/2003 | Sogabe | |
| 6,585,556 B2 | 7/2003 | Smirnov | |
| 6,587,751 B2 | 7/2003 | Takamura et al. | |
| 6,597,342 B1 | 7/2003 | Haruta | |
| 6,609,968 B1 | 8/2003 | Okada et al. | |
| 6,652,383 B1 | 11/2003 | Sonoda et al. | |
| 6,656,049 B1 | 12/2003 | Masaki et al. | |
| 6,712,698 B2 | 3/2004 | Paulsen et al. | |
| 6,722,973 B2 | 4/2004 | Akaishi | |
| 6,722,989 B1 | 4/2004 | Hayashi | |
| 6,748,326 B1 | 6/2004 | Noma et al. | |
| 6,773,325 B1 | 8/2004 | Mawle et al. | |
| 6,773,344 B1 | 8/2004 | Gabai et al. | |
| 6,832,955 B2 | 12/2004 | Yokoi | |
| 6,884,163 B2 | 4/2005 | Namba et al. | |
| 6,916,241 B2 | 7/2005 | Utsu | |
| 6,929,543 B1 | 8/2005 | Ueshima et al. | |
| 7,001,272 B2 | 2/2006 | Yamashita et al. | |
| 7,008,288 B2 | 3/2006 | Covannon et al. | |
| 2001/0001767 A1 | 5/2001 | Miyamoto | |
| 2001/0031652 A1 | 10/2001 | Gabai | |
| 2002/0022507 A1 | 2/2002 | Dan | |
| 2002/0098879 A1 | 7/2002 | Rheey | |
| 2002/0132654 A1 | 9/2002 | Akaishi | |
| 2003/0027636 A1 | 2/2003 | Convannon | |
| 2003/0054868 A1 | 3/2003 | Paulsen | |
| 2003/0137515 A1 | 7/2003 | Cederwall | |
| 2004/0133354 A1 | 7/2004 | Low | |
| 2004/0254004 A1 | 12/2004 | Kojima | |
| 2004/0268042 A1 | 12/2004 | Okada | |
| 2005/0048457 A1 | 3/2005 | Ferrigno | |
| 2005/0227750 A1 | 10/2005 | Brase | |
| 2006/0030405 A1 | 2/2006 | Robertson | |
| 2006/0063573 A1 | 3/2006 | Ishikawa | |
| 2006/0068860 A1 | 3/2006 | Ueshima | |
| 2006/0082579 A1 | 4/2006 | Yao | |
| 2007/0093170 A1 | 4/2007 | Zheng | |

FOREIGN PATENT DOCUMENTS

| | | | |
|---|---|---|---|
| EP | 0915412 | | 12/1999 |
| EP | 1000643 | | 5/2000 |
| EP | 1078660 | | 2/2001 |
| FR | 2834913 | | 7/2003 |
| JP | 2000334163 | | 12/2000 |
| JP | 2001179666 | | 7/2001 |
| JP | 2002224460 | | 8/2002 |
| JP | 2003047771 A | * | 2/2003 |
| JP | 2004141544 | | 5/2004 |
| WO | 2005076190 | | 8/2005 |

OTHER PUBLICATIONS

PCT International Search Report and Written Opinion for PCT/US07/79758 Issued Sep. 16, 2008.

The Patent Office of the People'S Republic of China, Office Action for Chinese Application No. 2007800361021, Jan. 20, 2012, 9 pages.

* cited by examiner

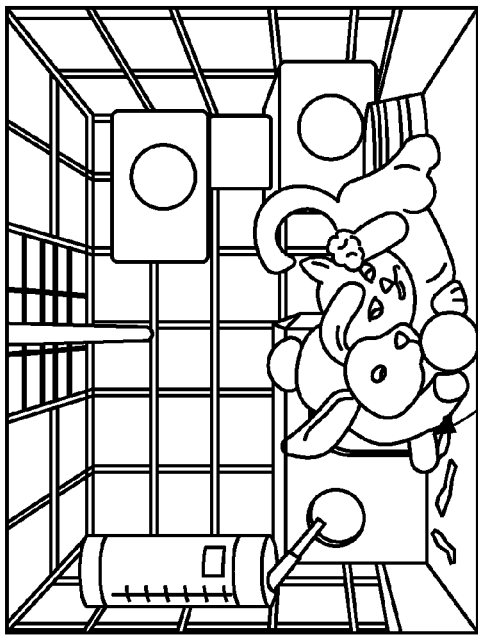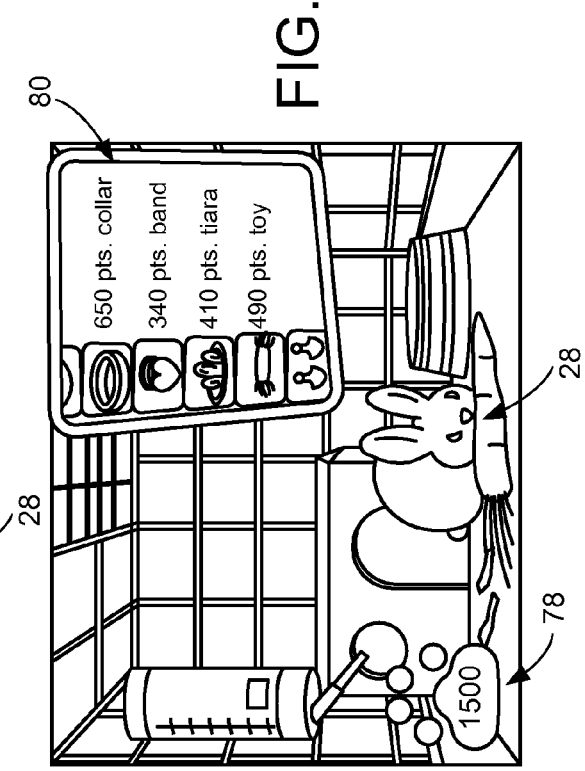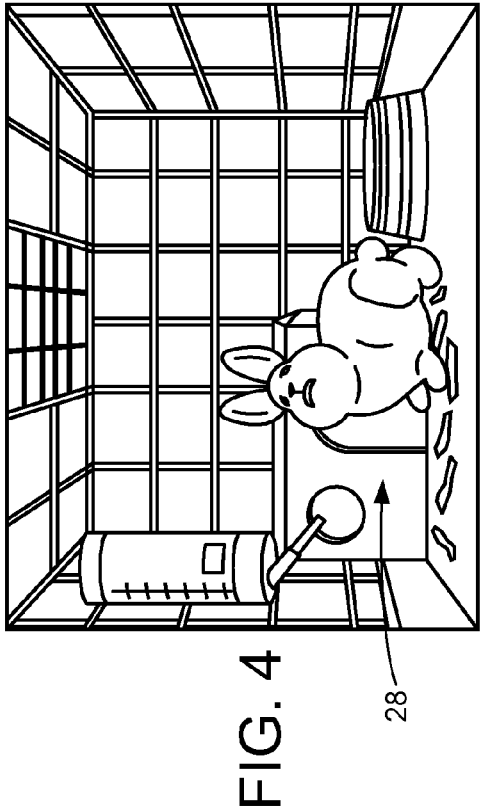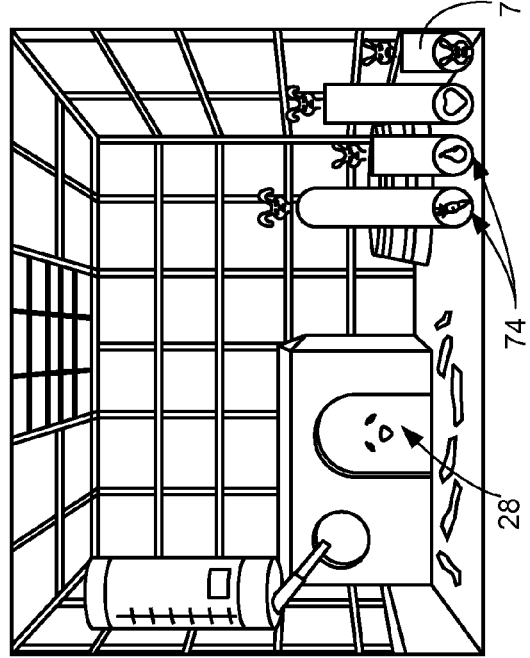

INTERACTIVE TOY AND DISPLAY SYSTEM

CROSS-REFERENCE TO RELATED APPLICATIONS

This application claims priority under 35 U.S.C. 119(e) to U.S. Provisional Patent Application No. 60/848,146 entitled "Interactive Toy and Television System," filed Sep. 28, 2006, the disclosure of which is incorporated herein by reference.

BACKGROUND

Children and young adults enjoy simulating adult activities, such as caring for children and animals. However, toy systems are limited in their level of interactivity between these toys and their users and often do not provide enough play options to maintain the attention of the users.

Toys incorporating interactivity between dolls and electronic display systems are found in U.S. Pat. Nos. 5,636,994, 6,012,961, 6,022,273, and 7,008,288, the disclosures of which are incorporated herein by reference.

Electronic toys incorporating simulated growth of living things are found in U.S. Pat. Nos. 5,572,646, 5,966,526, 6,537,149, 6,652,383, 6,832,955, 6,884,163, and 6,916,241, the disclosures of which are incorporated herein by reference.

Other examples of interactive toys are found in U.S. Pat. Nos. 5,192,082, 5,630,043, 5,752,880, 5,766,077, 5,913,727, 5,966,129, 5,977,951, 6,028,593, 6,075,195, 6,108,012, 6,160,540, 6,200,219, 6,201,947, 6,213,871, 6,227,966, 6,238,291, 6,251,012, 6,268,872, 6,290,604, 6,312,335, 6,366,288, 6,461,238, 6,463,257, 6,517,438, 6,585,556, 6,587,751, 6,597,342, 6,609,968, 6,656,049, 6,712,698, 6,722,973, 6,722,989, 6,748,326, 6,773,344, 6,929,543, and 7,001,272, U.S. Reissue Pat. No. 34,161, U.S. Patent Application Publication Nos. 2001/0001767, 2001/0031652, 2002/0022507, 2002/0098879, 2002/0132654, 2002/0132655, 2003/0027636, 2003/0054868, 2003/0137515, 2004/0133354, 2004/0254004, 2004/0268042, 2005/0048457, 2005/0227750, 2006/0030405, 2006/0063573, 2006/0068860, 2006/0082579, and foreign patent documents EP0915412, FR2834913, JP2000334163, JP2001179666, JP2002224460, JP2004141544, and WO2005076190.

The disclosures of the above-cited documents are incorporated herein by reference, in their entirety and for all purposes.

SUMMARY

The present disclosure relates generally to an interactive toy and display system. More specifically, it relates to a virtual pet system in which a user interacts both with a toy and with a corresponding virtual representation of the toy shown on the display.

The disclosed interactive system may be understood more readily after a consideration of the drawings and the Detailed Description.

BRIEF DESCRIPTION OF THE DRAWINGS

FIG. 4 illustrates a display showing an exemplary virtual pet in the form of a rabbit, and an associated environment.

FIG. 5 illustrates the virtual pet of FIG. 4 being visited by another virtual pet in the form of a cat.

FIG. 6 illustrates a display showing exemplary status indicators for the virtual pet of FIG. 4.

FIG. 7 illustrates a display showing an exemplary point system, and associated store, for the virtual pet of FIG. 4.

DETAILED DESCRIPTION

Figure 1:
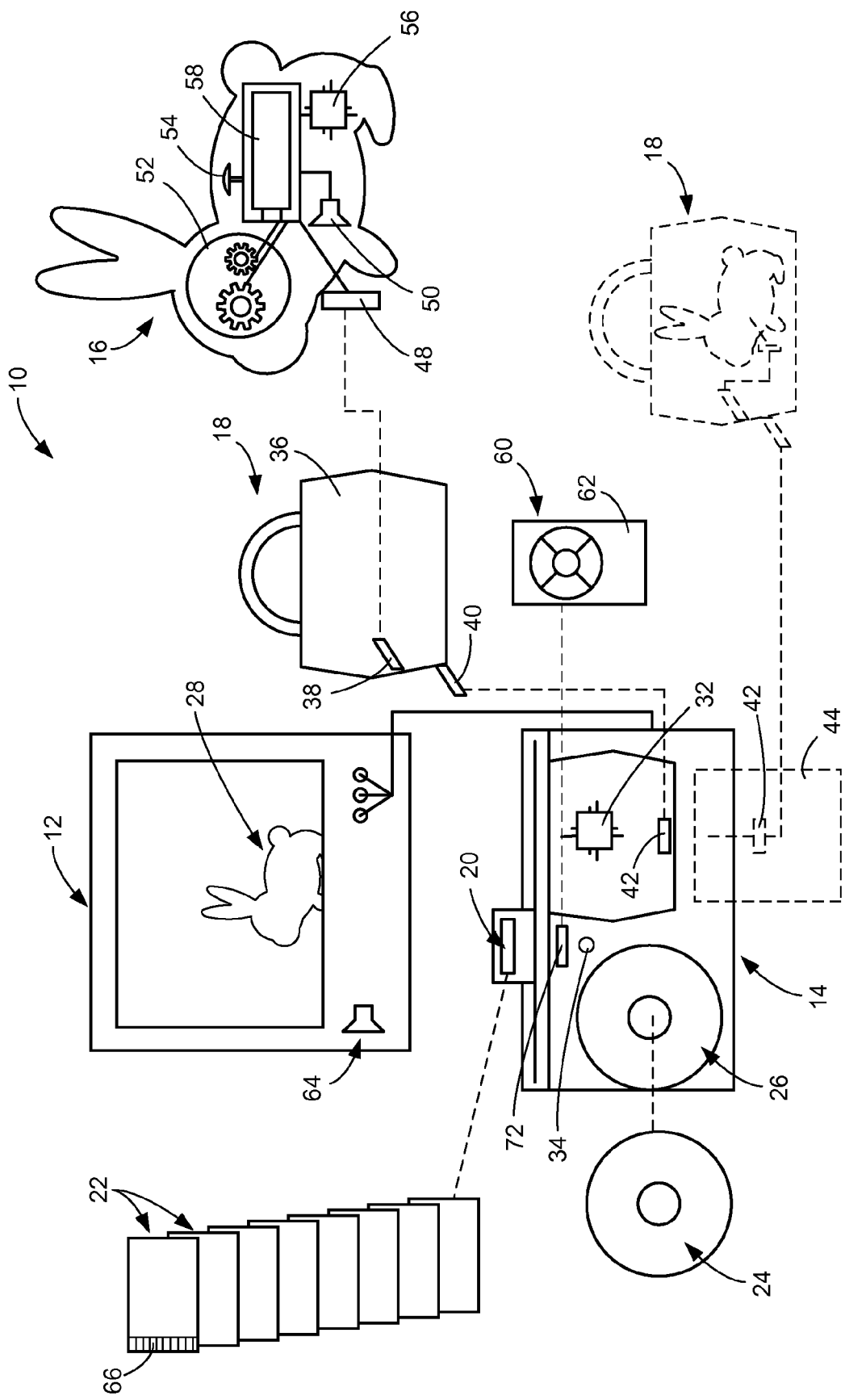
FIG. 1 is a schematic diagram of an illustrative interactive toy system including a toy, a display, a console having a card reader, cards, an adapter, and a remote control.
Figure 2:
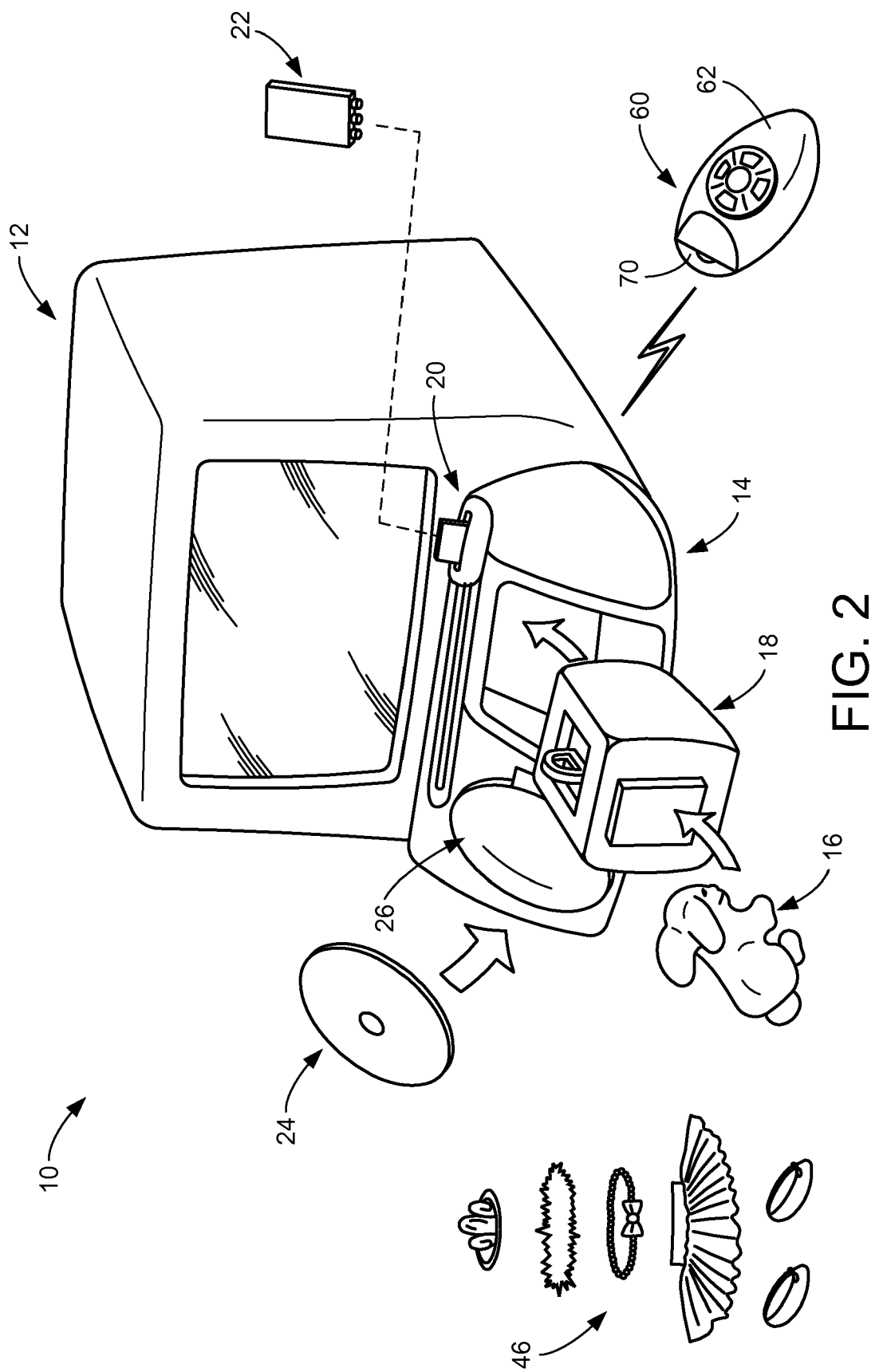
FIG. 2 depicts an example of an interactive toy system.
Figure 3:
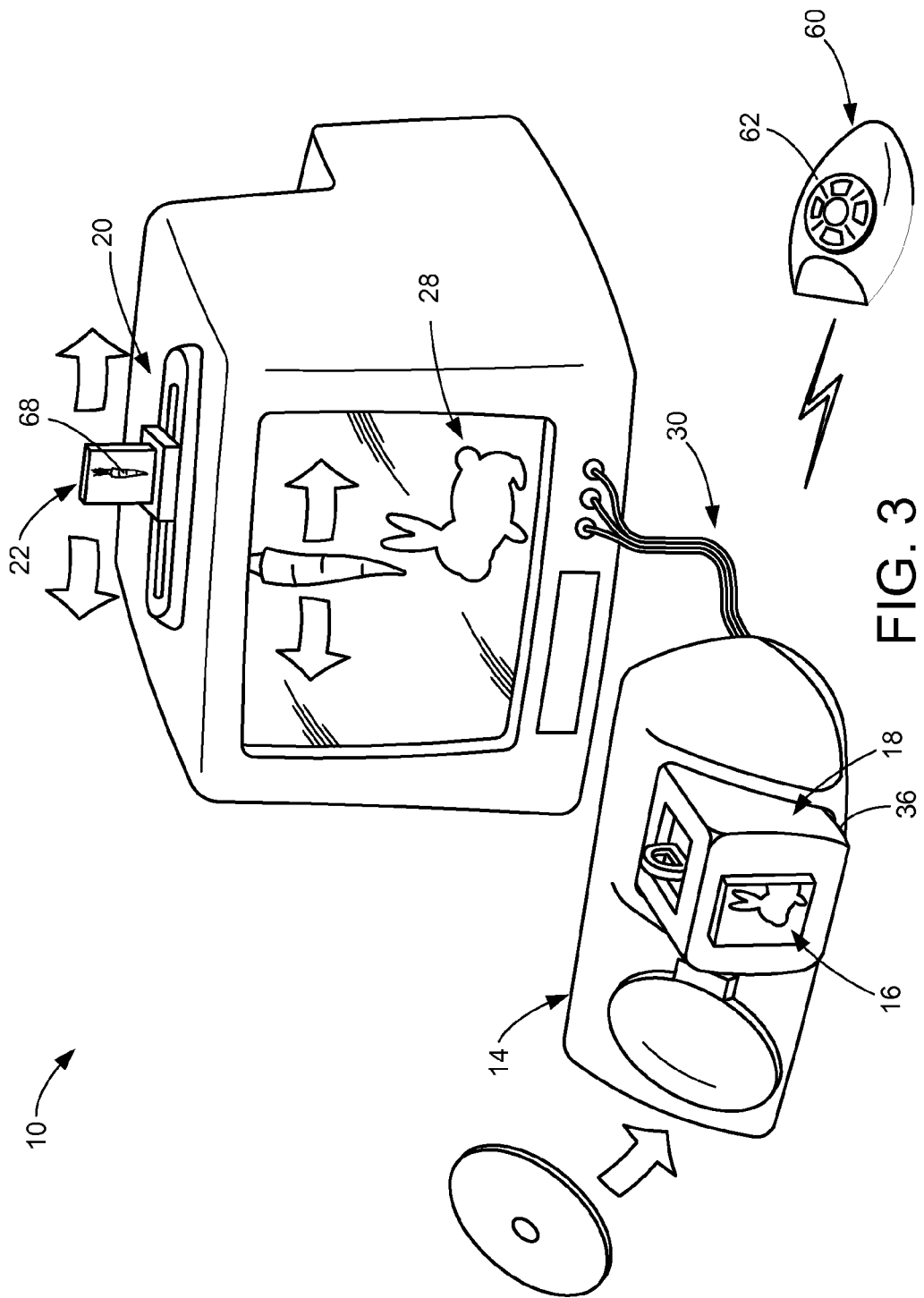
FIG. 3 depicts another example of an interactive toy system.

FIGS. 1-3 depict interactive toy systems 10 that provide a user with both a toy and an electronic version of the toy. The interactive toy systems are each shown to include a display 12, a console 14 configured to control the display, a toy 16, and an adapter 18 configured to form a communication link between the toy and the console. As shown in the schematic diagram of FIG. 1 and as discussed in more detail below, the system may be configured to interact with various combinations of toys, consoles, and/or adapters.

The system may include a card reader 20, which may be associated with the console, and cartridges or cards 22 configured to provide data or instructions to the system via the card reader. Data or instructions may alternatively, or additionally, be provided through traditional programming media 24, such as a compact disc or digital video disc, and associated media reader 26.

Display 12 is configured to exhibit an image including an electronic image 28, also referred to as a virtual representation, associated with toy 16, shown as an image of the toy by the display. For example, when the toy represents a pet, the display may exhibit a virtual pet. The display may take any suitable form, including, but not limited to, a computer monitor, a television, a liquid crystal display panel, and the like.

As previously noted, the console is configured to control the display, such as by controlling the image exhibited by the display. Console 14 is configured to couple with the other components of the toy system in an suitable manner and in any suitable location. In the example shown in FIGS. 1-3, the console is configured to couple with the display, such as via connectors in the front of the display housing. The console may include audio/visual cords 30 to couple to the display, such as to a traditional television, as shown in FIG. 3. In some versions of the interactive toy system, the console is configured to wirelessly communicate with the display, the adapter, and/or the toy. In some versions, the console may be integrally formed with the display and/or adapter.

The console may house a central processing unit or other system programming and/or memory 32, such as shown in FIG. 1 to store game features, toy information, and the like. The console may be configured to receive a portion of adapter 18 to form a communication link between the toy and the console or otherwise communicate information from the toy to the display, such as wirelessly. The console may include preloaded information or may be configured to interact with programming media 24, such as a cartridge or compact disc, or an internet connection, such as through a website, to read and/or transfer programs and/or data to the console. Consequently, additional toys and program upgrades may be incorporated into the interactive toy system. For example, a user may upload program information to customize the electronic version of the toy and environment to include a theme or details related to a particular product line, cartoon, or movie. In some versions of the interactive toy system, the console may include a microphone 34 and associated voice-recognition capability, such as to allow a user to verbally enter commands to the console.

Adapter 18 is configured to form a communication link between toy 16 and the console and/or display. The adapter communicates information regarding the toy, such as may be stored, for example, on an electronic identification tag incorporated into the toy, so that the information may be incorporated into an electronic version of the toy, such as image 28. For example, the adapter may couple the toy with the console, may sense information about the toy, and/or may communicate information about the toy to the console to alter the electronic version of the toy that is being displayed. The adapter may be configured to detect the presence of a toy and communicate this information to the console and/or the display. The adapter may be integrally formed with the display or with the console. The adapter may communicate with the toy, console, and/or display wirelessly or mechanically. For example, the adapter may form a wireless communication link between the toy and the console, may include a socket to receive a portion of the toy on one end and a plug to couple to the console on an opposing end of the adapter, or suitable combinations thereof.

The adapter may be shaped or otherwise configured to represent a home or transport structure for the toy. For example, as shown in FIGS. 1-3, the adapter may be configured to represent a pet carrier 36 for a toy in the form of a pet or other animal. The adapter may be configured to determine which toy is associated with the adapter, such as by which toy pet has been placed inside the carrier. The adapter may have one or more connectors 38 on the inside of the carrier, such as to couple a toy placed inside the adapter with the adapter.

The adapter may be configured to receive or otherwise couple with more than one toy, or may be configured to couple to other adapters in addition to being coupled with the console, so that more than one electronic image may be displayed at a time. For example, each adapter may include a connector 40 on the front and back of the adapter, such as a male connector on one end and a female connector on the other end, so that more than one adapter may be coupled in series with the console. In such a version of the toy system, the display may be configured to operatively couple, such as via the console, with two or more adapters and simultaneously display virtual representations of the toys associated with each adapter. The console may therefore include one or more suitable connectors 42 and receiving regions 44 to couple the adapters to the console.

The toy itself may be fashioned to have any desired appearance and may include movable components. As shown in FIGS. 1-3, the toy may be a toy figure configured to represent a variety of animals, including, but not limited to, rabbits, hamsters, dogs, cats, turtles, birds, fish, and the like. As previously noted, the adapter may take the form of a pet carrier suitable for the toy pet, such as a kennel, bird cage, tank, and the like. The toy may be formed from any suitable material and may take any suitable form, including, but not limited to, a plush toy, an action figure, a doll, a robot, and the like. Accessories 46 that are associated with the toy may be provided, such as a pet collar, clothing, costume components, pet chew toys, and the like.

Toy 16 may include mechanical linkages, magnetic, infrared or other electronic identification tags to communicate with the console via the adapter and identify the particular toy and/or otherwise differentiate among multiple toys. The adapter may automatically identify the toy, or the user may be required to manually couple the toy to the adapter, such as by a plug or other connector 48, as shown in FIG. 1. For example, the toy may include an array of protrusions that couple with corresponding receiving portions in the adapter when the toy is placed in the adapter to establish a communication link, such as by closing a switch, and thereby identify the inserted toy. The toy and/or adapter may include magnets to assist a child in aligning the connectors. In other versions of the interactive toy system, an accessory, such as in the form of a pet collar, may include suitable components to form an electronic identification tag.

The toy may be animated such as by being configured to emit sounds and move one or more body portions. For example, toy 16 in FIG. 1 includes a speaker 50 to emit sounds and a motor 52 to drive moveable limbs or other features of toy 16. For example, the toy may be configured to represent a dog and may therefore simulate actions such as barking, tilting its head, sitting or laying down, and/or wagging its tail. The toy may optionally include sensors 54 configured to detect and record the type and frequency of interaction with a user. For example, the toy may include a sensor to detect and record how often a user pets the toy or places objects configured to represent food into or near the toy's mouth, and the like.

The toy may include a user interface to communicate with a user. For example, the toy may include a pet tag or locket that includes an LCD screen to communicate information to a user. The user interface may prompt the user to interact with the toy, for example, by displaying symbols or animations on the LCD screen. For example, the user interface may inform the user that the pet, in its virtual or toy form, is hungry, that the pet needs more exercise, and the like. The user interface may be integrally formed with connector 48. The toy may further include a memory chip or CPU 56 and a battery 58, as needed.

The toy may be configured to exhibit changes in appearance in response to game play, such as to simulate growth or development. For example, a series of differently sized toys may be provided for a user to interact with at various stages of game play, or a single toy may be used which changes its animations and/or physical characteristics to correspond to game play.

The system may include one or more user input devices 60, such as a remote control 62, to allow a user to interact with the virtual representations shown on the display. A user may, for example, use an input device to place items within the electronic version of the pet's home. For example, the user may place virtual items such as a food dish and water bottle within the electronic environment by pressing buttons on the carrier, by placing corresponding actual items within the carrier, by operating the remote control, and so forth. The user input devices may be any suitable devices or combination of devices, including, but not limited to, buttons, dials, levers, plugs, and/or keypads disposed on the toy, adapter, console, and/or display, accessories configured for wireless communication, such as remote control 62, and the like.

The toy may include one or more sensors adapted to detect a user's interaction with the toy. The adapter may communicate the user interaction, such as by transferring recorded interaction data, to the console to alter the displayed image in response to the user interaction with the toy. User interaction with the toy and with the corresponding electronic image may be recorded to access one or more game features to be display. In some versions of the toy, the pet appears to live in the display and the toy and console are used to communicate care information of the toy to the electronic version of the toy. For example, one or more sensors 54 of the toy 16 may be used to determine how often the toy has been petted. The memory chip 56 of the toy 16 may record the frequency and duration of such user interaction. When the toy is coupled to the adapter and/or console, the length of petting time may be communicated to the electronic version of the pet. While the toy is not coupled, the toy may provide feedback to a user through a speaker 64 in the display, such as by purring. Direct interaction with the toy may be recorded as one aspect of interacting with the electronic pet, such as through nurturing of the pet.

Another method of communicating with the electronic version of the toy or otherwise adding game information and features is through cards 22. The cards may include any suitable identification mechanism, including, but not limited to, a resistor recognition circuit 66 to uniquely identify each card. The cards may be configured to provide game and/or toy information or other instructions to the console to alter the electronic image exhibited on the display. Receipt of each card in the card reader may be recorded, such as by the console, and may instruct the display to alter the image based on the recorded receipt of the cards.

The card reader may be configured to receive a card and instruct the display, such as through the console, to further exhibit a corresponding representation related to the card. Further, as shown in FIG. 1, card reader 20 may be configured to move relative to the display, such as to provide additional play options. The display may be configured to show movement of the corresponding representation in response to movement of the card reader relative to the display. For example, a user may place a card in the card reader and maneuver, such as by sliding, the card and card reader as a unit relative to the console and/or display to produce a corresponding lateral movement of the card's electronic representation by the display. Movement of a card and/or card reader relative to the console and/or display may therefore be mimicked in the virtual environment. For example, a user may move a card depicting a broom back and forth within the reader to produce a corresponding image of a broom and a sweeping action within the virtual environment, such as to sweep the floor of a pet's home. As another example, a user may move a card depicting a leash back and forth within the reader to walk the virtual pet back and forth across the display or otherwise manipulate the direction of travel of the electronic pet. In the example shown in FIG. 3, a food card 68 depicting a carrot is inserted into the card reader and moved laterally to produce a corresponding lateral movement of a carrot dangled in front of a virtual rabbit.

A variety of cards may be provided to interact with the toy system. The cards may communicate information and/or commands regarding nurturing or other care of the animal, such as feeding, or playtime activities, such as tug-of-war, fetch, blowing bubbles, and other tricks. The system may prompt a user to interact with the toy and/or the virtual version of the toy. For example, the toy may whine until a user responds by touching it, or the virtual version of the pet may sit next to a water bottle until the bottle is filled by the user by pressing a corresponding button on the remote control to otherwise providing suitable input to the console. The card reader may resemble a drawer, into which various cards may be placed, to communicate with the electronic pet. To train the pet, a user may insert a training card and speak a command. When the command has been spoken a predetermined number of times, the pet may begin to respond to the command accordingly.

As depicted in FIGS. 1-3, the interactive toy system may include remote control 62 to allow a user to interact with the system while positioned remotely from the console. The remote control may allow a user to cycle through menu options, access a camera feature, play a game, decorate the toy's virtual environment, enroll the toy in a virtual contest, and the like. For example, the remote control shown in FIG. 2 includes a flap 70 that, when raised, allows a user to access a camera mode of the remote control. The remote control may then instruct the console, via a wireless receiver 72, to record the image exhibited on the display for subsequent viewing by a user. The toy system may therefore allow a user to take snapshots of the electronic pet. The snapshots may be stored in a photo album for later viewing and/or printing. As such, a user may, for example, create a photo album illustrating the life of the pet.

The exemplary toy system is configured to entertain a child, such as by providing for the simulation of nurturing a domesticated animal, a video game including one or more characters controlled by the user, and the like. As previously discussed, a user may have several options for interacting with a game character that corresponds to the toy, such as in the form of a virtual pet, by talking to the pet through a microphone, feeding, or otherwise interacting with the pet through a card reader, manipulating the remote control, and the like.

Each toy may be associated with one or more characteristics 74, such as to represent the toy's health, emotional contentment, hunger, and the like. In versions of the toy that include sensors 54, at least one of the sensors may be adapted to detect a user's interaction with the toy and determine a value for a corresponding characteristic. The virtual representation of the toy may be altered in response to a change in the value of a characteristic. The value of the characteristics may be displayed when an associated representation of the toy is displayed, as shown in FIG. 6. As shown, the display may exhibit various status indicators 76, such as to provide feedback to a user regarding the pet's various characteristics. Optionally, the toy may include a display that indicates one or more characteristics. For example, the display may communicate mood to tell a user how the pet is feeling when the pet is not coupled to the adapter. The mood display may take the form of an LCD screen on a collar or locket, such as in the form of connector 48, or on a portion of the toy, such as a screen on the back of the toy or a change in eye color, etc.

When a user boots the console for the first time, a user interface may prompt the user to allow the system to recognize the toy for the first time, such as by inserting the toy into the carrier and, if suitable, connecting the carrier to the console. The system may read the toy information, verify the type of toy, and prompt the user to provide personal information, such as a name for the pet. Information may be entered through a microphone system having voice recognition capability, a keyboard, a touch screen, dials, remote controls, and the like. A user may be allowed to customize the virtual environment, such as by introducing and/or rearranging objects within the environment, changing the appearance of objects and scenery, and the like. Optionally, the toy system may provide a tutorial to explain game play to a user.

The virtual version of the pet may be programmed to perform various acts, such as eating or practicing tricks, while the user is not interacting with the system. For example, a user may program the pet to practice rolling over while the user is away. Such programming may count towards virtual growth of the pet. FIGS. 4-7 depict exemplary electronic images 28. A virtual pet may arrange and/or decorate its environment, as shown in FIG. 4, play with another virtual pet, as shown in FIG. 5, sleep and/or display its health and/or mood to a user, as shown in FIG. 6, and eat, as shown in FIG. 7. The virtual pet and/or toy may be configured to grow, for example, in size or appearance in response to interaction from a user. The virtual pet may be configured to grow to the point of reproduction. For example, a virtual pet may leave a baby pet for the user to care for, thereby creating additional play options.

Artificial intelligence programming may be used to make the electronic version of the toy appear more realistic. For example, the toy system may use task lists and decision trees to control the virtual pet's animations based on the pet's various characteristics.

In some versions of game play, points may be earned by a user throughout interaction with the toy system, and shown on the display, such as in FIG. 7 at 78. The points may be used to gain access to additional game features or accessories. A user may obtain points by properly caring for the pet and, as shown in FIG. 7, may use the points to purchase virtual versions of accessories 46 for the virtual pet through a virtual store 80.

In an exemplary version of the above-described toy system, the toy system is configured to simulate the process of raising and caring for a domesticated animal, such as a pet rabbit, fish, lizard, hamster, cat, or dog. The animal exists as both a plush toy and as an electronic animal representation. A user is therefore able to interact with the plush toy in the real world and with the electronic version of the toy in a virtual world. For example, the toy system may provide an interactive experience that mimics raising a pet from infancy to adulthood utilizing both a physical plush toy and an interactive video game. Software may be used to record whether a user provides a pet with adequate food, water, grooming, and exercise. As a user completes these tasks, new game features may become available and/or the pet may mature. A user may alternatively, or additionally, earn points that may be used to access game levels or purchase accessories, such as from a virtual pet store. When multiple toys are connected to the console, characteristics 74 may be passed between the electronic versions of the toys, such as by transferring a characteristic from an electronic version of a first toy to an electronic version of a second toy. For example, a pet that is not well cared for may become ill. The illness may be contagious and therefore spread to another pet that is connected to the console.

In some versions of the toy system that include a microphone, the system identifies the sound of the user's voice as good or bad. For example, if a user yells or says "no," the virtual pet may hide. If a user speaks softly or says "yes," the virtual pet may appear to approach the user, wag its tail, and the like.

The components of the interactive system may be fabricated from any suitable material, or combination of materials, which may be selected to provide a desirable combination of weight, strength, durability, cost, manufacturability, appearance, safety, and the like.

Although the present invention has been shown and described with reference to the foregoing operational principles and preferred embodiments, it will be apparent to those skilled in the art that various changes in form and detail can be made without departing from the spirit and scope of the invention. The present invention is intended to embrace all such alternatives, modifications and variances. The subject matter of the present invention includes all novel and nonobvious combinations and subcombinations of the various elements, features, functions and/or properties disclosed herein. Inventions embodied in various combinations and subcombinations of features, functions, elements, and/or properties may be claimed through presentation of claims in a subsequent application.

What is claimed is:

1. An interactive toy system comprising:
    a toy figure;
    a display configured to exhibit an electronic image associated with and representative of the toy figure;
    a console configured to control the exhibited image;
    an adapter configured to provide a communication link between the toy figure and the console;
    a card; and
    a card reader configured to move relative to the display and provide instructions to the console to alter the exhibited image in response to the card being received by the card reader
    wherein the console is configured to show movement of the exhibited image in response to movement of the card reader relative to the display.

2. The interactive toy system of claim 1, wherein the card includes a resistor recognition circuit configured to uniquely identify the card.

3. The interactive toy system of claim 1, wherein the toy figure includes one or more sensors adapted to detect physical interaction with the toy figure and further wherein the adapter communicates such interaction to the console to alter the image in response to the interaction with the toy figure.

4. The interactive toy system of claim 3, wherein the interaction with the toy figure provides access to one or more game features.

5. The interactive toy system of claim 1, further comprising a remote control, wherein the remote control is configured to instruct the console to record the image exhibited by the display for subsequent viewing by a user.

6. An interactive toy system comprising:
    a toy carrier;
    a toy pet configured to mechanically engage with the toy carrier and thereby close a switch in the carrier, wherein the toy carrier is configured to identify the toy pet upon closing of the switch;
    a display configured to exhibit an electronic image associated with the identified toy pet; and
    a card reader configured to move relative to the display and configured to receive a card and instruct the display to further show movement of a virtual representation related to the card in response to the movement of the card reader.

7. The interactive toy system of claim 6, further comprising a console configured to control the image exhibited by the display, wherein the toy carrier is configured to form a communication link between the toy pet and the console.

8. The interactive toy system of claim 7, further comprising at least one card configured to provide instructions to the console to alter the electronic image exhibited on the display.

9. The interactive toy system of claim 8, wherein the toy pet includes one or more sensors adapted to detect interaction between a user and the toy pet, and further wherein the console is configured to alter the electronic image exhibited on the display in response to the interaction detected by the one or more sensors.

10. An interactive toy system comprising:
    a toy pet;
    a display configured to show an image including a virtual representation of the toy pet;
    a toy carrier configured to detect the presence of the toy pet and communicate with the display; and
    a card reader configured to move relative to the display and configured to receive a card and instruct the display to further show a virtual representation related to the cart
    wherein the display is configured to show movement of the virtual representation related to the card in response to movement of the card reader relative to the display.

11. The interactive toy system of claim 10, wherein sliding of the card reader relative to the display produces lateral movement of the virtual representation related to the card.

12. The interactive toy system of claim 10, further comprising a plurality of cards each including game information, wherein receipt of each card in the card reader is recorded and the display is instructed to alter the image including the virtual representation of the toy pet based on the recorded receipt of the cards.

13. The interactive toy system of claim 10, wherein the toy pet includes one or more sensors adapted to detect a user's interaction with the toy pet, and further wherein the toy carrier is configured to communicate the user interaction to alter the virtual representation of the toy pet in response to the user interaction with the toy pet.

* * * * *